2,706,143
Patented Apr. 12, 1955

2,706,143
PROCESS FOR TREATING FEATHERS

Patrick A. Florio, Elmhurst, N. Y., assignor to Alexander Smith, Incorporated, Yonkers, N. Y., a corporation of New York Application May 17, 1952, Serial No. 288,539

1 Claim. (Cl. 8—94.1)

This invention relates to a process for improving the characteristics of keratinaceous fibers and more particularly to a process for treating land fowl feathers to increase the filling power thereof.

An object of the invention is to make land fowl feathers suitable for use in place of water fowl feathers as a filler for mattresses and pillows, as an insulating medium for clothing, and for other uses wherein water fowl feathers have heretofore been considered essential.

The "filling power" is defined as the specific volume of a given weight of the material under a predetermined light load.

Another object is to produce a land fowl feather in which the barbs extend in different planes around the quill as distinguished from the single plane in which such barbs normally lie.

Other objects and advantages will be apparent from the following detailed description.

In accordance with this invention it has been found that a chemical treatment of land fowl feathers with certain organic salts and alcohols, followed by the steps of washing and drying, produces the desired results. The process involves digesting the feathers for a period of time in a solution of the treating agent. The treating agent is believed to act as a protein coagulant, setting up internal strains which cause the barbs to curl and fluff with an increase in specific volume.

More specifically the fibers are digested under reflux with a solution consisting of resorcinol and an alcohol for a period of several hours, for example 3 hours. They are then washed with water and dried on a rotary type drier. Suitable alcohols are polyvinyl, isopropyl, propyl, ethyl and methyl.

The concentration of the resorcinol in alcohol may be varied from 2% to 20%. The quantity of solution depends upon the nature of the fibers and the amount of agitation. The time of digestion varies inversely with the temperature which may be varied from room temperature to the reflux temperature of the solution. The resorcinol and alcohol may be of commercial grade and may be recycled a number of times. The drier temperature may vary from 75° C. to 95° C. and the time in the drier varies inversely with the temperature.

The combined effect of the resorcinol and alcohol is to cause the fibers to fluff and curl. Chicken feathers which ordinarily have a straight quill and barbs lying in one plane are converted into a soft fluffy state with a curled and softened quill and barbs extending in different planes around the quill similar to duck feathers.

The action of the alcohol may be that of softening the feather structure and the resorcinol may have the added effect of a protein coagulant.

The following are specific examples:

EXAMPLE I
*Use of resorcinol and isopropyl alcohol*

A solution consisting of 100 parts by weight of resorcinol and 2000 parts by weight of isopropyl alcohol was placed in a three-neck flask equipped with a reflux condenser and an agitator. 50 grams of chicken feathers having a filling power of 35% of the filling power of an equal weight of water fowl feathers were added to the solution. The whole mass, heated by means of a hot plate, was allowed to reflux at 182° F. for a period of 3 hours under slow agitation. The feathers were then washed with water until free of alcohol, and then passed through squeeze rollers to remove excess water. They were dried in a rotating drier at 85° F. to 110° F. The treated feathers demonstrated a filling power equivalent to 83.3% of the filling power of an equal weight of water fowl feathers. It was noted that the treated feathers were odorless, waterproof, and appeared quite fluffy.

EXAMPLE II
*Use of resorcinol and polyvinyl alcohol*

A solution consisting of 100 parts by weight of resorcinol, 200 parts by weight of polyvinyl alcohol, and 2000 parts of water was placed in a three-neck flask equipped with a reflux condenser and an agitator. 60 grams of chicken feathers having a filling power of 35% the filling power of water fowl were added to the solution. The whole mass was heated by means of a hot plate and allowed to digest for a period of 2 hours at 165° F. They were washed in water until alcohol free, then passed through a squeeze roller to remove excess water and placed in a rotary drier where they were dried at temperatures ranging from 85° F. to 110° F. The treated feathers demonstrated a filling power equivalent to 85.4% of that of an equal weight of water fowl feathers. It was noted the treated feathers were odorless, waterproof and appeared quite fluffy.

The process has been described specifically as applied to feathers. It is useful, however, for improving the characteristics of other keratinaceous fibers such as wool and when so used increases the crimp and fluffiness thereof.

What is claimed is:

The process for increasing the fluffiness of feathers which comprises digesting said feathers with continuous agitation in a solution of from 2% to 20% of resorcinol in an alcohol selected from the group consisting of polyvinyl alcohol, isopropyl alcohol, propyl alcohol, ethyl alcohol and methyl alcohol under reflux conditions at the boiling temperature of the solution for two to three hours, washing to remove the alcohol, and drying.

References Cited in the file of this patent

UNITED STATES PATENTS

| | | |
|---|---|---|
| 2,131,145 | Schlack | Sept. 27, 1938 |
| 2,445,029 | Jones | July 13, 1948 |

FOREIGN PATENTS

| | | |
|---|---|---|
| 620,213 | France | Jan. 15, 1926 |
| 820,144 | France | July 26, 1937 |
| 902,282 | France | Nov. 27, 1944 |